(12) United States Patent
Zimmerman et al.

(10) Patent No.: US 10,762,149 B2
(45) Date of Patent: Sep. 1, 2020

(54) SYSTEM AND METHOD FOR INDUCING USER ACTIVITY VIA ENHANCED WEB CONTENT

(71) Applicant: NAMOGOO TECHNOLOGIES LTD., Herzeliya (IL)

(72) Inventors: Keren Zimmerman, Tel Aviv (IL); Noam Javits, Tel Aviv (IL)

(73) Assignee: Namogoo Technologies Ltd., Herzeliva (IL)

( * ) Notice: Subject to any disclaimer, the term of this patent is extended or adjusted under 35 U.S.C. 154(b) by 139 days.

(21) Appl. No.: 15/621,644

(22) Filed: Jun. 13, 2017

(65) Prior Publication Data

US 2017/0277803 A1    Sep. 28, 2017

Related U.S. Application Data

(63) Continuation of application No. PCT/US2016/013548, filed on Jan. 15, 2016.

(60) Provisional application No. 62/103,601, filed on Jan. 15, 2015.

(51) Int. Cl.
  *G06F 3/048* (2013.01)
  *G06F 16/9535* (2019.01)
  *G06Q 30/02* (2012.01)

(52) U.S. Cl.
  CPC ........ *G06F 16/9535* (2019.01); *G06Q 30/02* (2013.01); *G06Q 30/0255* (2013.01); *G06Q 30/0271* (2013.01)

(58) Field of Classification Search
  CPC ........ G06Q 30/00; G06Q 30/02; G06F 3/048; G06F 17/00; G06F 3/00; G06F 16/00
  See application file for complete search history.

(56) References Cited

U.S. PATENT DOCUMENTS

| | | |
|---|---|---|
| 2008/0270163 A1 | 10/2008 | Green |
| 2008/0313038 A1 | 12/2008 | Wajihuddin |
| 2009/0006551 A1 | 1/2009 | Guday et al. |
| 2010/0251304 A1* | 9/2010 | Donoghue ......... H04N 5/44543 725/46 |
| 2013/0227023 A1* | 8/2013 | Raichelgauz .......... H04H 60/31 709/204 |

(Continued)

OTHER PUBLICATIONS

The International Search Report and the Written Opinion of the International Searching Authority for PCT/US2016/013548 dated Jun. 30, 2016, ISA/RU, Moscow, Russia.

*Primary Examiner* — Hugo Molina
(74) *Attorney, Agent, or Firm* — Lowenstein Sandler LLP

(57) ABSTRACT

A system and method for inducing user activity via enhanced web content. The method includes receiving data respective of interactions of a user with web content displayed on a user device during at least one electronic transaction, wherein the web content is associated with at least a product; determining, based on the received data, a user impression; generating a user profile including at least the determined user impression; determining at least one content modification parameter respective of the generated user profile; determining at least one criterion respective of the at least one content modification parameter; and causing a display of enhanced content based on the at least one content modification parameter, when the at least one criterion is met.

19 Claims, 2 Drawing Sheets

(56) References Cited

U.S. PATENT DOCUMENTS

| | | | | |
|---|---|---|---|---|
| 2014/0200971 A1* | 7/2014 | Raichelgauz | .......... | H04H 60/31 |
| | | | | 705/14.6 |
| 2016/0112735 A1* | 4/2016 | Stephens, Jr. | ........ | H04N 21/252 |
| | | | | 725/14 |
| 2016/0124580 A1* | 5/2016 | Chen | .................... | G06F 3/0481 |
| | | | | 715/745 |

* cited by examiner

SYSTEM AND METHOD FOR INDUCING USER ACTIVITY VIA ENHANCED WEB CONTENT

CROSS-REFERENCE TO RELATED APPLICATIONS

This application is a continuation of International Application No. PCT/US2016/013548 filed Jan. 15, 2016 which claims the benefit of U.S. Provisional Application No. 62/103,601 filed on Jan. 15, 2015, the contents of which are hereby incorporated by reference.

TECHNICAL FIELD

The present disclosure relates generally to web content, and particularly to automatically enhancing web content for optimal visitor experiences.

BACKGROUND

The way people shop has significantly progresses since the development of the worldwide web (WWW). Consumers can now shop from the convenience of their homes, offices, or while on the road using portable devices. Shopping websites, though differing in nature, allow consumers to purchase goods and services from anywhere in the world over the Internet, often at much lower prices than local merchant sales. From the merchant's perspective, this online availability provides access to a much wider market of potential customers.

Particularly large electronic commerce (e-commerce) websites have typical daily traffic of millions of visitors. Operators of such large e-commerce websites often wish to analyze the traffic visiting the website to determine successes in marketing such as, e.g., which advertising campaigns are successfully, which products sell best, which types of users respond positively to marketing tactics, whether website goals are being met, and so on.

Because operators of e-commerce websites seek to maximize success of marketing, these operators seek to adapt their websites to enhance visitor experiences, thereby increasing traffic. Existing solutions for adapting websites to enhance visitor experiences typically require manual consideration of marketing success or inflexible rules based on overall website performance (e.g., changing content on the website if less than 50% of users interact with the content). Typically, such rules do not allow for immediate adjustment of web content based on user preferences. For e-commerce websites, this inflexibility may result in lost opportunities to sell products.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for inducing user activity via enhanced web content. The method includes receiving data respective of interactions of a user with web content displayed on a user device during at least one electronic transaction, wherein the web content is associated with at least a product; determining, based on the received data, a user impression, wherein the user impression includes a definitive value representing the user interactions with the web content; generating a user profile including at least the determined user impression; determining at least one content modification parameter respective of the generated user profile; determining at least one criterion respective of the at least one content modification parameter; and causing a display of enhanced content based on the at least one content modification parameter, when the at least one criterion is met.

The disclosed embodiments also include a system for inducing user activity via enhanced web content. The system includes a processing unit; and a memory, the memory containing instructions that, when executed by the processing unit, configure the system to: receive data respective of interactions of a user with web content displayed on a user device during at least one electronic transaction, wherein the web content is associated with at least a product; determine, based on the received data, a user impression, wherein the user impression includes a definitive value representing the user interactions with the web content; generate a user profile including at least the determined user impression; determine at least one content modification parameter respective of the generated user profile; determine at least one criterion respective of the at least one content modification parameter; and cause a display of enhanced content based on the at least one content modification parameter, when the at least one criterion is met.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
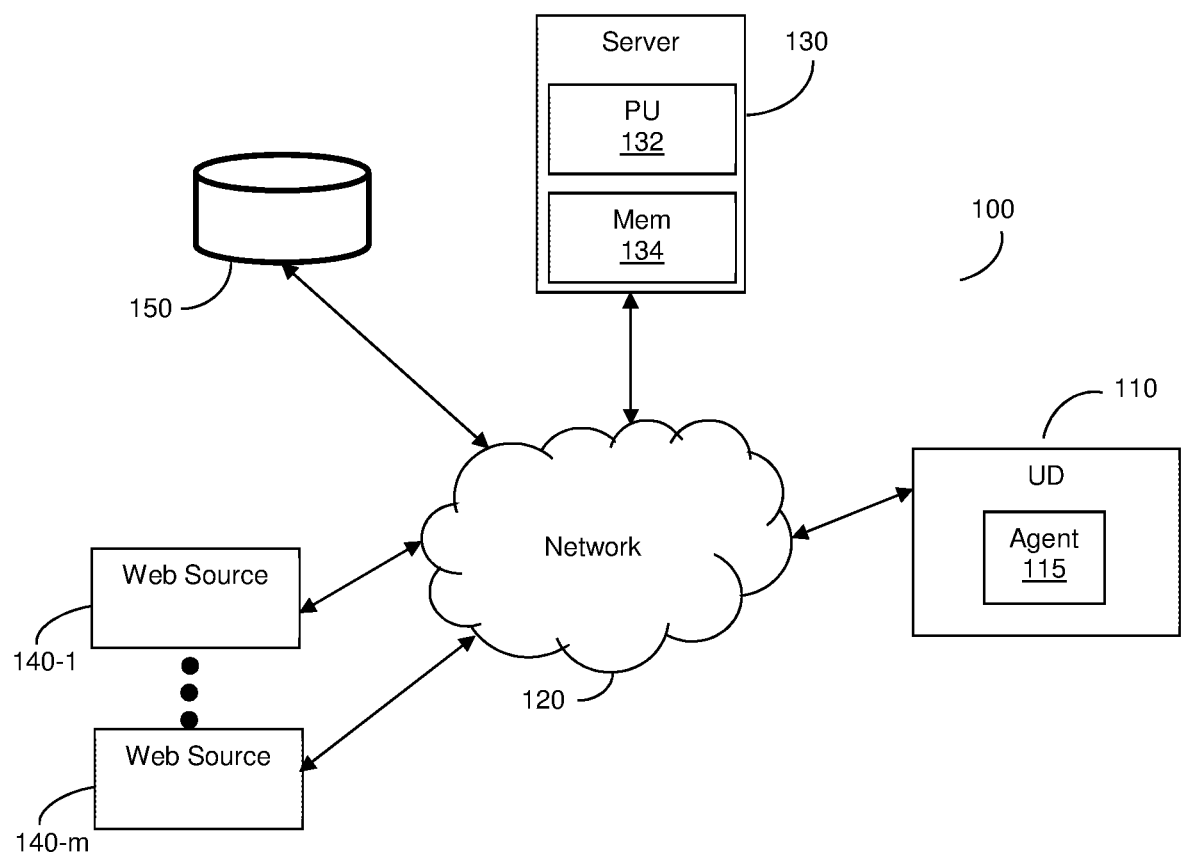
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting network diagram 100 utilized to describe the various disclosed embodiments. A user device (UD) 110, a server 130, a plurality of web sources 140-1 through 140-n (hereinafter referred to individually as a web source 140 and collectively as web sources 130), and a database 150 are communicatively connected via a network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

The user device 110 may be, but is not limited to, a personal computer, a laptop, a tablet computer, a smartphone, a wearable computing device, or any other device equipped with web browsing capabilities. In an embodiment, the user device 100 may be installed with an agent 115. The agent 115 may be an application executed or accessed through the user device 110 such as, but not limited to, a mobile application, a virtual application, a web application, a native application, and the like. The user device 110 and/or the agent 115 may display web content from the web sources 140 to a user of the user device and receive user interactions respective of the displayed content.

The web sources 140 may be, but are not limited to, electronic commerce (e-commerce) web-sites, travel web-sites, services web-sites, and any other web source through which the user is able to interact with content (e.g., to purchase goods or services). The user may be able to perform electronic transactions via the web sources 140. Such electronic transactions may include any type of sale or purchase of goods and/or services. The electronic transactions may involve the user interacting with content displayed in web pages (not shown) on the user device 110 visited by the user.

In an embodiment, the agent 115 may be configured to capture any user interaction with respect to electronic transactions. That is, if the user checked a specific product, e.g., by clicking on tapping on an image showing the product, then such interaction will be captured. It should be noted that interactions of a user with content can be performed regardless of whether a respective electronic transaction has been completed. The captured data may include, but is not limited to, metadata, display features, a product offered for sale, combinations thereof, and so on. In an embodiment, the metadata may include product specifications such as, but not limited to, prices, suggested discounts, payment methods, sizes, colors, types, and so on. The display feature may be any visual element presented to the user device 110 with respect to a particular display of content. For example, the feature may be an advertisement or banner displayed with respect to a transaction. The captured data is sent to the server 130 from the user device 110 over the network 120. In an embodiment, such information is sent during a browsing session and/or when the browsing session ends.

The server 130 is configured to determine a user impression of the user based on the user interactions and/or the data related to the displayed content. The user impression may be a definitive value representing the user interactions respective of the data. The definitive value may be based on, but is not limited to, actions taken by the user respective of the displayed content, a duration of time spent viewing the content, a result of the user interactions (e.g., viewing additional content and/or leaving a web page), and so on. The determination of the user impression may further include analyzing each element displayed via the user device 110 to identify one or more contributing elements (i.e., elements indicative of the user impression). For example, the determination may include identifying an element in the displayed content that the user clicked on, thereby contributing to a positive user impression.

The user impression may represent an interest or other inclination of the user toward the content. In an embodiment, the user impression may further represent an interest in a product associated with the displayed content. The user interest may be, e.g., positive, negative, neutral, and so on. The user impression may further indicate a degree of inclination such as, for example, high, low, medium, and so on. The user impression may be represented as a numeric value, a Boolean value, a string, and the like.

As an example, a user impression related to a completion of a transaction to purchase a product (e.g., clicking a "Purchase" button displayed on the user device 110) may be determined as a highly positive user impression, while a user impression related to abandonment of an electronic shopping cart (e.g., by leaving the web page) may be determined as a negative user impression. As another example, a user viewing particular content for a duration of time that is above a predefined threshold may be determined as a positive user impression. As yet another example, if the user interacted with the content to view further content (e.g., clicking on an ad), the user impression may be determined as highly positive.

The server 130 is configured to generate or update a user profile for the user of the user device 110. The user profile includes the user impression respective of the displayed content. The user profile may be stored in the database 150 and/or locally on the user device. In an embodiment, the user profile may be utilized to determine modifications for enhancing web content to improve user experience and, consequently, user performance. The improved user performance may result in increased frequency, duration, and/or quality of user interactions. The user performance may be based on, but is not limited to, an amount of time spent by a user viewing the content, a number of user interactions performed by the user respective of the content, types of user interactions with the content (e.g., clicks, scrolls, gestures, etc.), results of user interactions with the content (e.g., an amount of money spent via e-commerce websites), and so on.

The server 130 is configured to analyze the user profile and to determine user performance parameters that may be improved. The improvable user performance parameters may include, but are not limited to, particular types of user interactions (e.g., clicking, scrolling, etc.), interactions (or lack thereof) with particular elements (e.g., clicking a "like" or "purchase" button), frequency of user interactions, duration of user interactions, and so on. The improvable user performance parameters may be identified based on previous user interactions respective of the content or related content. For example, an improvable user performance parameter for a banner on a web page may be clicking on the banner when the user has hovered a mouse icon over the banner.

Based on the user performance parameters that can be improved, the server 130 is configured to determine one or more content modification parameters for inducing user activity. Determining the content modification parameters may include identifying parameters of the user performance that can be improved and identifying content modification parameters respective of the improvable parameters. As an example, if a user has viewed a web page featuring a product offering but has not purchased the product, content modification parameters for inducing the user to obtain more information about the product may be identified.

In an embodiment, the server 130 may be further configured to determine one or more criteria respective of each content modification parameter. The criteria may be dependent on the user and may be time-based, performance-based, and so on. The criteria may include a threshold (e.g., a time threshold, a performance threshold, and so on). Upon determination that the criteria for a particular content modification is met, the server 140 may be configured to modify the content displayed on the user device 110 accordingly.

As a non-limiting example, a user profile indicates that the user clicked an advertisement stating "fill in a form and save 5% on your purchase" only when the price of a product was above $300. Respective thereto, the server 130 may determine discount banners for items priced above $300 as modified content to be displayed on the user device 110.

As another example, if a user profile indicates that the user viewed a particular web page, previous user interactions of the user may be determined. Based on the previous user interactions, it is determined that the user only interacted with web pages when the web page display was at least partially blue. Accordingly, the server may determine a modified web page with a blue background as modified content to be displayed on the user device 110.

The server 130 typically includes a processing unit 132 coupled to a memory 134. The processing unit 132 may comprise or be a component of a processor (not shown) or an array of processors coupled to the memory 134. The memory 144 contains instructions that can be executed by the processing unit 132. The instructions, when executed by the processing unit 132, cause the processing unit 132 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

It should be noted that the embodiments disclosed herein are described with respect to one user device 110 merely for simplicity purposes and without limitations on the disclosed embodiments. Multiple user devices may be communicatively connected to the network 120 to receive enhanced web content in accordance with the embodiments disclosed herein. It should be further noted that the server 130 may reside in a cloud computing platform, a datacenter, and the like. Moreover, in an embodiment, there may be a plurality of servers operating as described hereinabove and configured to either have one as a standby, to share the load between them, or to split the functions between them.

Figure 2:
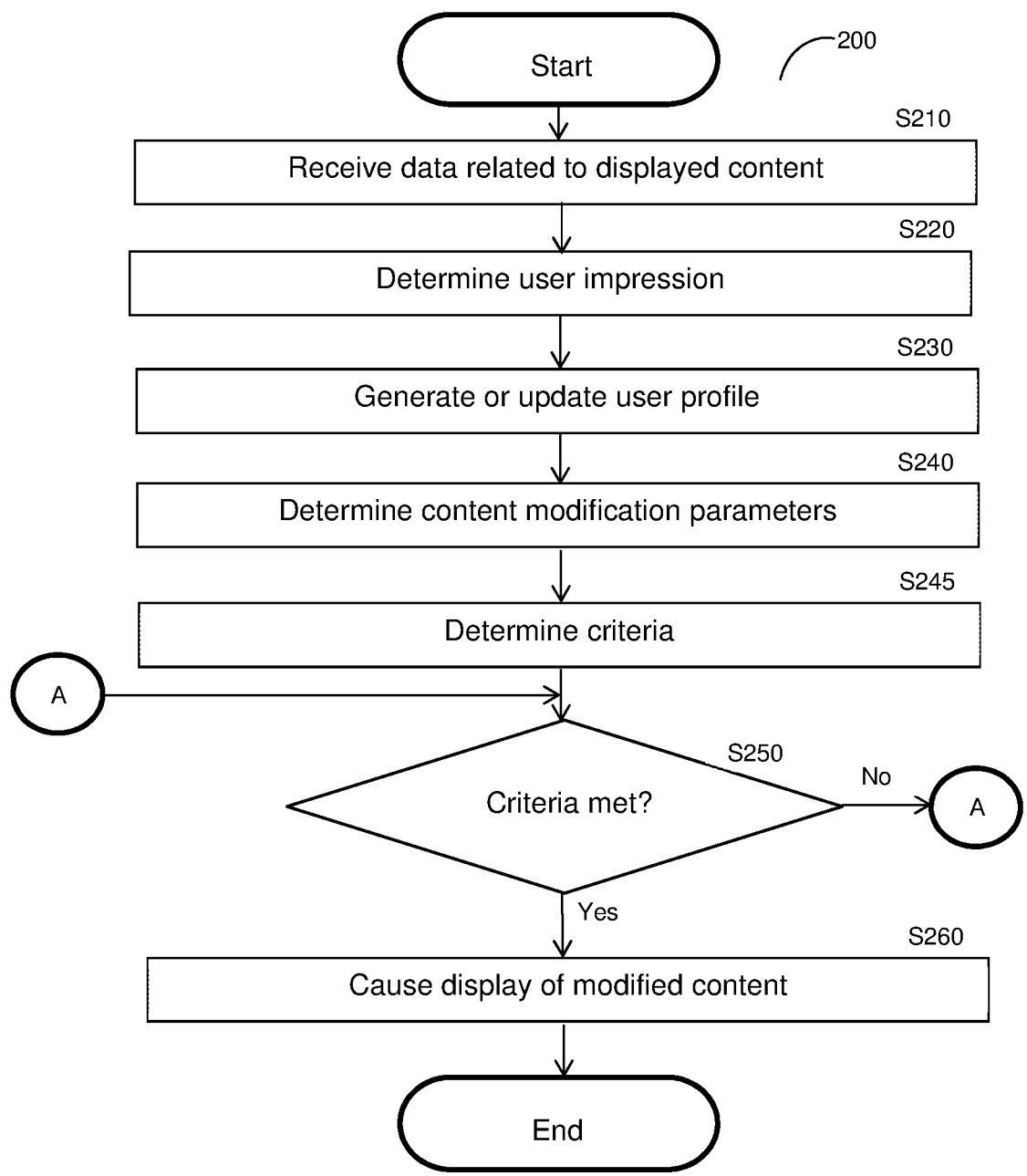
FIG. 2 is a flowchart illustrating a method for enhancing web content based on user impressions according to an embodiment.

FIG. 2 is an exemplary and non-limiting flowchart 200 illustrating a method for inducing user activity via enhanced web content according to an embodiment. In an embodiment, the method may be performed by a server (e.g., the server 130).

In S210, data captured respective of interactions of a user with content displayed on a user device during an electronic transaction is received. As noted above, captured data may include, but is not limited to, metadata, display features, a product offered for sale, combinations thereof, and so on. In an embodiment, the metadata may include product specifications such as, but not limited to, prices, suggested discounts, payment methods, sizes, colors, types, and so on. The display feature may be any visual element presented to the user device with respect to a particular display of content.

In S220, respective of the received data, a user impression is determined. The user impression may be a value representing an interest of the user respective of the displayed content. In an embodiment, the user impression may further represent an interest respective of a product associated with the displayed content. The user interest may be, e.g., positive, negative, neutral, and so on. The user impression may further indicate a degree of interest such as, for example, high, low, medium, and so on.

In an embodiment, the determination of the user impression may further include analyzing elements of the displayed content to determine one or more contributing elements for the user impression. In an embodiment, the user impression may be determined based on, but not limited to, a type of user interaction (e.g., a click, a scroll, a gesture on a touch screen, etc.), a duration of time for which content was viewed, a result of a user interaction (e.g., viewing additional content, leaving the web page, and so on).

In S230, a user profile is generated or updated. The user profile includes the user impression. The user profile may indicate data related to displayed content respective of the user impression. As an example, the user profile may indicate that a user did not view additional content after viewing a web page featuring an image of lightning. In an embodiment, S230 may further include storing the generated user profile in a database.

In S240, one or more parameters for modifying content displayed on the web page is determined. The content modification parameters are determined such that the modified content will enhance the user's experience, thereby inducing a particular user activity or activities. To this end, S240 may further include identifying parameters of the user performance that can be improved and identifying content modification parameters respective of the improvable parameters. As an example, if a user has viewed a web page featuring a product offering but has not purchased the product, content modification parameters for inducing the user to obtain more information about the product may be identified.

In S245, one or more criteria for displaying content modified based on the content modification parameters are determined. The criteria may be time-based, performance-based, and so on. The criteria may be determined based on previous user interactions of the user and/or of similar users respective of the displayed content or related content. As an example, if user profiles of similar users indicate that such users typically purchased an item when a discount coupon is presented after viewing the item for at least 30 seconds, the criteria for a content modification including a discount offer for the item may be viewing the item for at least 30 seconds.

In an embodiment, S245 may further include determining similar user profiles respective of the generated user profile. Determining similar user profiles may include, but is not limited to, comparing the generated user profile to other user profiles (e.g., user profiles stored in a database) to identify other user profiles that match the generated user profile above a predefined threshold. The predefined threshold may be based on, but is not limited to, a number of matching user impressions, matching scores between user impressions (e.g., a matching score on a scale of 1 to 10, where 1 represents user profiles for unrelated products with different user impressions and 10 represents user profiles for identical products with the same user impression).

In S250, it is determined whether the criteria for the content modification parameters have been met and, if so, execution continues with S260; otherwise, execution waits until one of the criteria has been met. In an embodiment, execution may terminate before any of the criteria are met after, but not limited to, a predefined threshold time (e.g., 10 minutes), a particular action (e.g., leaving a web page, logging out of a web site, etc.), and so on.

In S260, upon determining that the criteria for a content modification has been met, the content may be modified based on the content modification parameters. Modifying the content may include, but is not limited to, sending additional content for display on the user device, sending the content with the modifications for display on the user device, and so on.

As a non-limiting example, data related to a web page displayed on the user device is received. The data includes a 5 minute video displayed on the web page and a click on a "play" button for the video. The video is identified as a contributing element. A positive user impression is generated respective of a pair of gloves featured in the video. A user profile including the positive user impression respective of the gloves is generated. Based on the user profile, it is determined that a user performance parameter could be improved by inducing the user to purchase the gloves. Accordingly, content modification parameters including adding an offer for the gloves is determined for improving user performance. Based on user profiles of other users, it is determined that users viewing the video were likely to purchase products were offered after 5 minutes (i.e., after the video is complete rather than during the video). Accordingly, a criterion of 5 minutes after clicking the "play" button is determined. After the user has viewed the web page for 5 minutes, the content in the webpage is modified to include the product offer.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for inducing user activity via enhanced web content, comprising:
   receiving data for interactions of a user with web content displayed on a user device during at least one electronic transaction, wherein the web content is associated with at least a product;
   determining, based on the received data, a user impression, wherein the user impression includes a definitive value representing the user interactions with the web content;
   generating a user profile including at least the determined user impression;
   determining at least one content modification parameter based on the generated user profile;
   determining at least one criterion based on the at least one content modification parameter; and
   causing a display of enhanced content based on the at least one content modification parameter, when the at least one criterion is met.

2. The method of claim 1, wherein each of the at least one criterion is any of: time-based and performance-based.

3. The method of claim 1, wherein the at least one content modification parameter is at least one of: a modification of a display feature, additional content to be displayed, and information to be displayed.

4. The method of claim 1, wherein the at least one criterion is generated based on any of: the generated user profile, and a plurality of similar user profiles.

5. The method of claim 4, wherein each similar user profile includes matches the generated user profile above a predefined threshold.

6. The method of claim 1, wherein the definitive value of the user impression further represents an interest of the user in the product.

7. The method of claim 1, wherein generating the user profile including at least the determined user impression further comprises:
   updating a predetermined user profile with the determined user impression.

8. The method of claim 1, wherein determining at least one content modification parameter based on the generated user profile further comprises:
   identifying, based at least on the generated user profile, a user performance parameter that can be improved, wherein the at least one content modification parameter is determined based on the identified user performance parameter.

9. The method of claim 8, wherein the user performance parameter includes at least one of: a type of user interaction, a particular element of the web content lacking interaction, a frequency of user interactions, a duration of user interactions.

10. A non-transitory computer readable medium having stored thereon instructions for causing one or more processing units to execute a method comprising:
    receiving data for interactions of a user with web content displayed on a user device during at least one electronic transaction, wherein the web content is associated with at least a product;

determining, based on the received data, a user impression, wherein the user impression includes a definitive value representing the user interactions with the web content;
generating a user profile including at least the determined user impression;
determining at least one content modification parameter based on the generated user profile;
determining at least one criterion based on the at least one content modification parameter; and
causing a display of enhanced content based on the at least one content modification parameter, when the at least one criterion is met.

11. A system for improving user activity via enhanced web content, comprising:
a processing unit; and
a memory, the memory containing instructions that, when executed by the processing unit, configure the system to:
receive data for interactions of a user with web content displayed on a user device during at least one electronic transaction, wherein the web content is associated with at least a product;
determine, based on the received data, a user impression, wherein the user impression includes a definitive value representing the user interactions with the web content;
generate a user profile including at least the determined user impression;
determine at least one content modification parameter based on the generated user profile;
determine at least one criterion based on the at least one content modification parameter; and
cause a display of enhanced content based on the at least one content modification parameter, when the at least one criterion is met.

12. The system of claim 11, wherein each of the at least one criterion is any of: time-based and performance-based.

13. The system of claim 11, wherein the at least one content modification parameter is at least one of: a modification of a display feature, additional content to be displayed, and information to be displayed.

14. The system of claim 11, wherein the at least one criterion is generated based on any of: the generated user profile, and a plurality of similar user profiles.

15. The system of claim 14, wherein each similar user profile includes matches the generated user profile above a predefined threshold.

16. The system of claim 11, wherein the definitive value of the user impression further represents an interest of the user in the product.

17. The system of claim 11, wherein the system is further configured to:
update a predetermined user profile with the determined user impression.

18. The system of claim 11, wherein the system is further configured to:
identify, based at least on the generated user profile, a user performance parameter that can be improved, wherein the at least one content modification parameter is determined based on the identified user performance parameter.

19. The system of claim 18, wherein the user performance parameter includes at least one of: a type of user interaction, a particular element of the web content lacking interaction, a frequency of user interactions, a duration of user interactions.

* * * * *